United States Patent [19]

Anderson

[11] Patent Number: 5,389,869
[45] Date of Patent: Feb. 14, 1995

[54] POWER CONTROL SYSTEM FOR AN A.C. INDUCTION MOTOR

[75] Inventor: Nicholas Anderson, Bayside, N.Y.

[73] Assignee: Energy Consortium, Inc.

[21] Appl. No.: 164,268

[22] Filed: Dec. 8, 1993

Related U.S. Application Data

[62] Division of Ser. No. 990,565, Dec. 14, 1992, Pat. No. 5,304,911.

[51] Int. Cl.⁶ .................. G06G 7/186; H02P 7/36
[52] U.S. Cl. ..................... 318/729; 330/110; 327/260
[58] Field of Search .......... 318/729; 307/490, 494; 330/9, 51, 69, 110, 260, 261, 282

[56] References Cited

U.S. PATENT DOCUMENTS

| | | | |
|---|---|---|---|
| 3,593,085 | 7/1971 | Decker | 318/302 |
| 4,021,832 | 5/1977 | Krehbiel et al. | |
| 4,047,226 | 9/1977 | Hedges | 358/193 |
| 4,052,648 | 10/1977 | Nola | 318/200 |
| 4,132,086 | 1/1979 | Kountz | |
| 4,190,793 | 2/1980 | Parker et al. | 318/800 |
| 4,210,948 | 7/1980 | Waltz | 361/76 |
| 4,242,625 | 12/1980 | Hedges | 318/729 |
| 4,266,177 | 5/1981 | Nola | 318/810 |
| 4,297,628 | 10/1981 | Hedges | 318/798 |
| 4,341,984 | 7/1982 | Parker et al. | 318/138 |
| 4,361,792 | 11/1982 | Davis, Jr. et al. | 318/729 |
| 4,382,223 | 5/1983 | Hedges | 323/242 |
| 4,387,329 | 6/1983 | Harlow | 318/729 |
| 4,400,657 | 8/1983 | Nola | 318/798 |
| 4,404,511 | 9/1983 | Nola | 318/729 |
| 4,414,499 | 11/1983 | Hedges | 318/798 |
| 4,417,190 | 11/1983 | Nola | 318/729 |
| 4,426,614 | 1/1984 | Nola | 323/243 |
| 4,430,607 | 2/1984 | Muth | 323/217 |
| 4,433,276 | 2/1984 | Nola | 318/729 |
| 4,439,718 | 3/1984 | Nola | 318/729 |
| 4,459,528 | 7/1984 | Nola | 318/729 |
| 4,462,044 | 7/1984 | Thomason et al. | |
| 4,469,998 | 9/1984 | Nola | 318/729 |
| 4,581,568 | 4/1986 | Fitzpatrick et al. | 318/729 |
| 4,636,702 | 1/1987 | Hedges | 318/729 |
| 4,727,305 | 2/1988 | Muskovac et al. | 318/798 |
| 4,800,326 | 1/1989 | Unsworth | 318/729 |
| 4,853,605 | 8/1989 | Matsuo et al. | 318/729 |
| 4,950,970 | 8/1990 | Davis, Jr. et al. | 318/809 |
| 4,982,147 | 1/1991 | Lauw | 318/729 |
| 5,121,409 | 6/1992 | Goss | |

Primary Examiner—Bentsu Ro
Attorney, Agent, or Firm—Kenyon & Kenyon

[57] ABSTRACT

A power factor control system for an A.C. induction motor determines the difference in phase between the voltage applied to the motor and the current drawn by the motor. Based upon this difference in phase, an integrator generates an error signal. The error signal is compared with a ramp wave to derive a pulse signal which controls the voltage applied to the motor, which in turn controls the amount of current supplied to the motor, in order to reduce the power consumed by the motor. The integrator includes a dual-path feedback filter having a polarized capacitor in each path. A power supply is used to quickly provide the full operating bias voltages required by several of the components contained in the control system.

4 Claims, 7 Drawing Sheets

POWER CONTROL SYSTEM FOR AN A.C. INDUCTION MOTOR

This application is a division of application Ser. No. 07/990,565, filed on Dec. 14, 1992, now U.S. Pat. No. 5,304,911.

FIELD OF THE INVENTION

The present invention relates to control systems and in particular to power factor control systems for A.C. induction motors.

BACKGROUND OF THE INVENTION

The difference in phase between the voltage supplied to an induction motor and the resulting current through the motor is indicative of the load on the motor. It is known for a power control system to be connected to a motor in order to detect and compare these supplied-voltage and resulting-current signals. Based upon this comparison, the power control system may then control the voltage applied to the motor, which in turn controls the flow of current to the motor, in order to reduce the power consumed by a less than fully loaded motor.

U.S. Pat. No. 4,266,177 to Nola, for example, describes a power control circuit for an induction motor wherein a servo loop is used to control the voltage applied to the motor, which in turn controls the flow of current to the motor, in order to reduce the power consumed by the motor. In particular, a pulse signal is used to control the "on" time of a triac which is in circuit with the motor in order to maintain motor operation at a selected power factor. The pulse signal is based upon the measured current-voltage phase angle.

Power factor controllers of the prior art, such as the one just described, use an integrator as part of the processing required to produce the pulse signal. Typically, the integrator includes an operational amplifier and a filter which includes a capacitor and provides a single path of feedback from the output of the operational amplifier to one of the inputs of the operational amplifier. In this arrangement, the value of the capacitor is relatively large, or else the motor may vibrate.

A command signal circuit is also connected to one of the inputs of the operational amplifier, which is typically the same input to which the filter is connected. Conventionally, the command signal circuit contains a potentiometer, which is a relatively expensive electrical component. The potentiometer must be adjusted for the particular motor being controlled in order to provide a proper bias voltage to the operational amplifier. If, as commonly occurs, the potentiometer is incorrectly set, and thus an improper bias voltage is provided, an improper pulse signal will be provided to the triac. This may result in vibration or stalling of the motor, or even failure to start the motor.

Power factor controllers require a power supply in order to provide an operating bias voltage of, for example, 15 volts, to the controller's active components, such as the operational amplifier of the integrator, so that the pulse signal is provided to the triac. In attempting to start the motor, if an improper pulse signal is provided to the triac because the operating bias voltage is not yet up to full potential, the motor may not start, even after a proper pulse signal is later provided.

Power factor controllers of the prior art typically deal with this problem in one of two ways. In particular, some power factor controllers use a transformer as part of the power supply. The transformer provides the full operating bias voltage quickly enough to start the motor. However, a transformer is a rather bulky electrical component that results in oversized control units.

Power factor controllers which do not use a transformer as part of the power supply typically use a resistor and filter capacitor having relatively large values in the power supply. However, because of the large value of the resistor, the power supply generates an excessive amount of heat. Moreover, because of the large value of the filter capacitor, the capacitor takes a relatively long time to charge in order to provide the full operating bias voltage. As a result, the controller may require an additional circuit, commonly referred to as a start-up, or delay, circuit, as described in U.S. Pat. No. 4,266,177. The start-up circuit prevents any power from being applied to the motor until the operating bias voltage is essentially at full operating level.

SUMMARY OF THE INVENTION

The present invention provides a power factor control system and method for controlling the voltage applied to an A.C. induction motor, which in turn controls the amount of current supplied to the motor, in order to reduce the amount of power consumed by a less than fully loaded motor. The power factor control system according to the present invention may be housed in a compact unit between an A.C. wall outlet and the motor.

The control system according to the present invention includes positive and negative voltage square wave generators, and positive and negative current square wave generators. The sum of the positive voltage signal and the negative current signal is logically ORed with the sum of the negative voltage signal and the positive current signal. In this manner, the control system determines the difference in phase between the voltage applied to the motor and the current drawn by the motor.

This OR signal, along with a fixed bias voltage that represents a preselected power factor of operation, are provided to an integrator of the present invention. The integrator includes a comparator and a dual-path feedback filter. One path of the feedback filter contains a polarized capacitor. The other path of the feedback filter contains a polarized capacitor and a resistor. The polarized capacitors have very small capacitance values.

The integrator of the present invention produces a very stable output signal over a wide variety of motors, while eliminating the need for a potentiometer and complicated circuitry in the ramp generator, which generates the ramp wave to which the integrator output signal is compared. The pulse signal, which controls the voltage applied to the motor and hence the amount of current flowing to the motor, is generated as a function of this comparison.

A power supply of the present invention is configured such that it supplies full operating bias voltages, which are required by several of the components of the control system according to the present invention, within a very short amount of time, without the use of transformers. As such, the power supply of the present invention eliminates the need for a start-up circuit. Moreover, because the power supply uses resistors having very small resistance values, the power supply and, thus, the control system of the present invention generates significantly less heat than conventional power factor control systems.

An embodiment of a power control system for an A.C. induction motor according to the present invention comprises the following:

- a voltage/current phase difference generator for determining a difference in phase between a voltage applied to the motor and a current drawn by the motor, and for generating a phase difference signal as a function of the determined difference in phase;
- an integrator, the integrator receiving the phase difference signal and generating an error signal for controlling an amount of power supplied to the motor as a function of the phase difference signal;
- the integrator including a feedback filter having first and second feedback paths, the first feedback path including a first polarized capacitor, the second feedback path including a second polarized capacitor and a resistor; and
- an electrical power supply, including a current-limiting component, a discharge capacitor coupled to the current-limiting component, a rectifier coupled to the discharge capacitor, and a filter capacitor coupled to the rectifier.

An embodiment of a method of controlling an amount of power supplied to an A.C. induction motor according to the present invention comprises the following steps:

- determining a difference in phase between a voltage applied to the motor and a current drawn by the motor;
- generating a phase difference signal as a function of the determined difference in phase;
- generating a control signal from an integrator receiving the phase difference signal for controlling an amount of power supplied to the motor as a function of the phase difference signal;
- providing a first feedback through a first polarized capacitor of the integrator; and
- providing a second feedback through a second polarized capacitor and a resistor of the integrator.

DETAILED DESCRIPTION

The configuration of the power factor control system for a motor according to the present invention will be explained with reference to the functional block diagram of FIG. 1 and to the circuit diagram of FIG. 2. Thereafter, the operation of the control system shown in FIGS. 1 and 2 will be further clarified with reference to the timing diagrams of FIGS. 3 and 4.

Figure 1A:
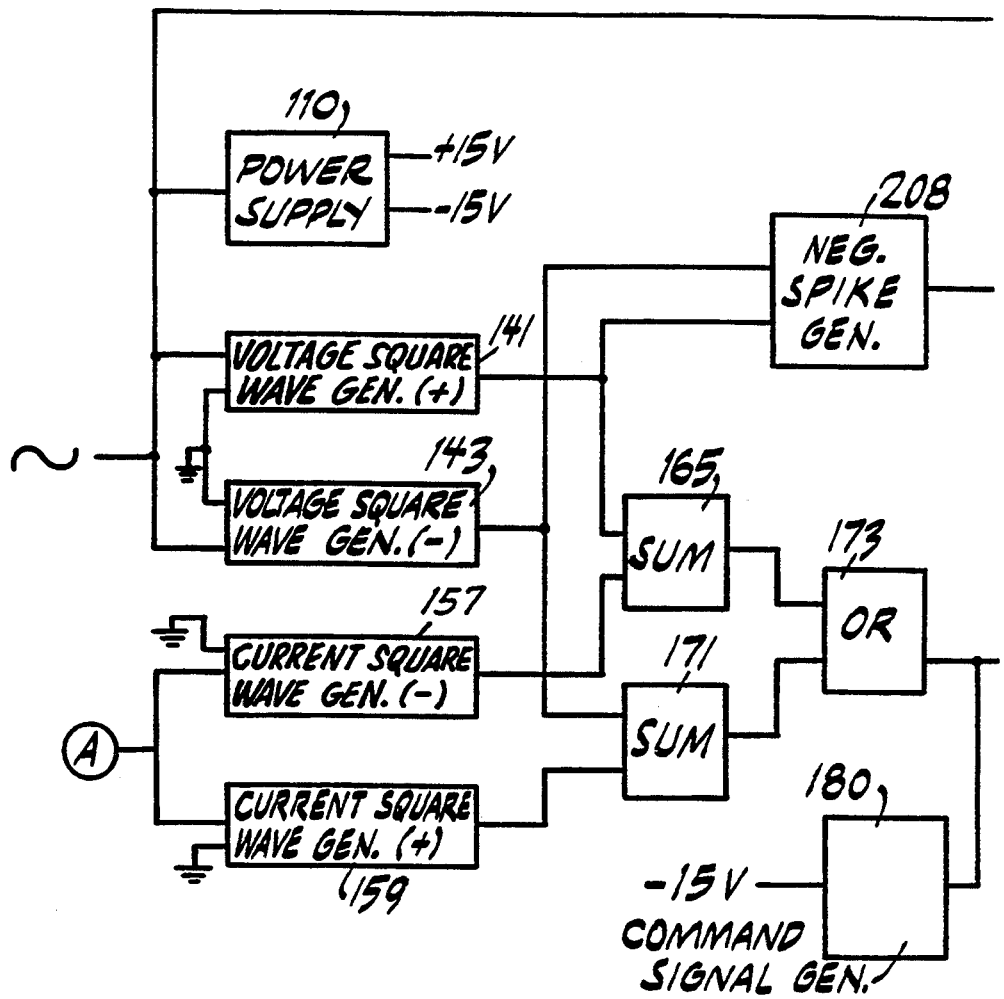
FIGS. 1A and 1B show a functional block diagram of the power control system according to the present invention.
Figure 1B:
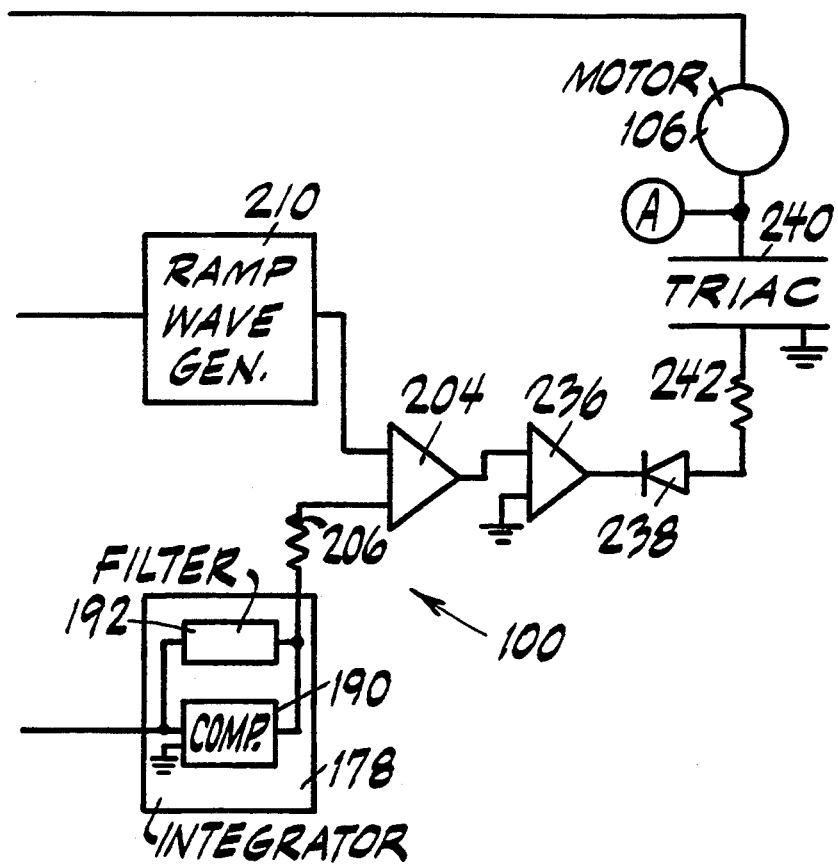
Figure 2A:
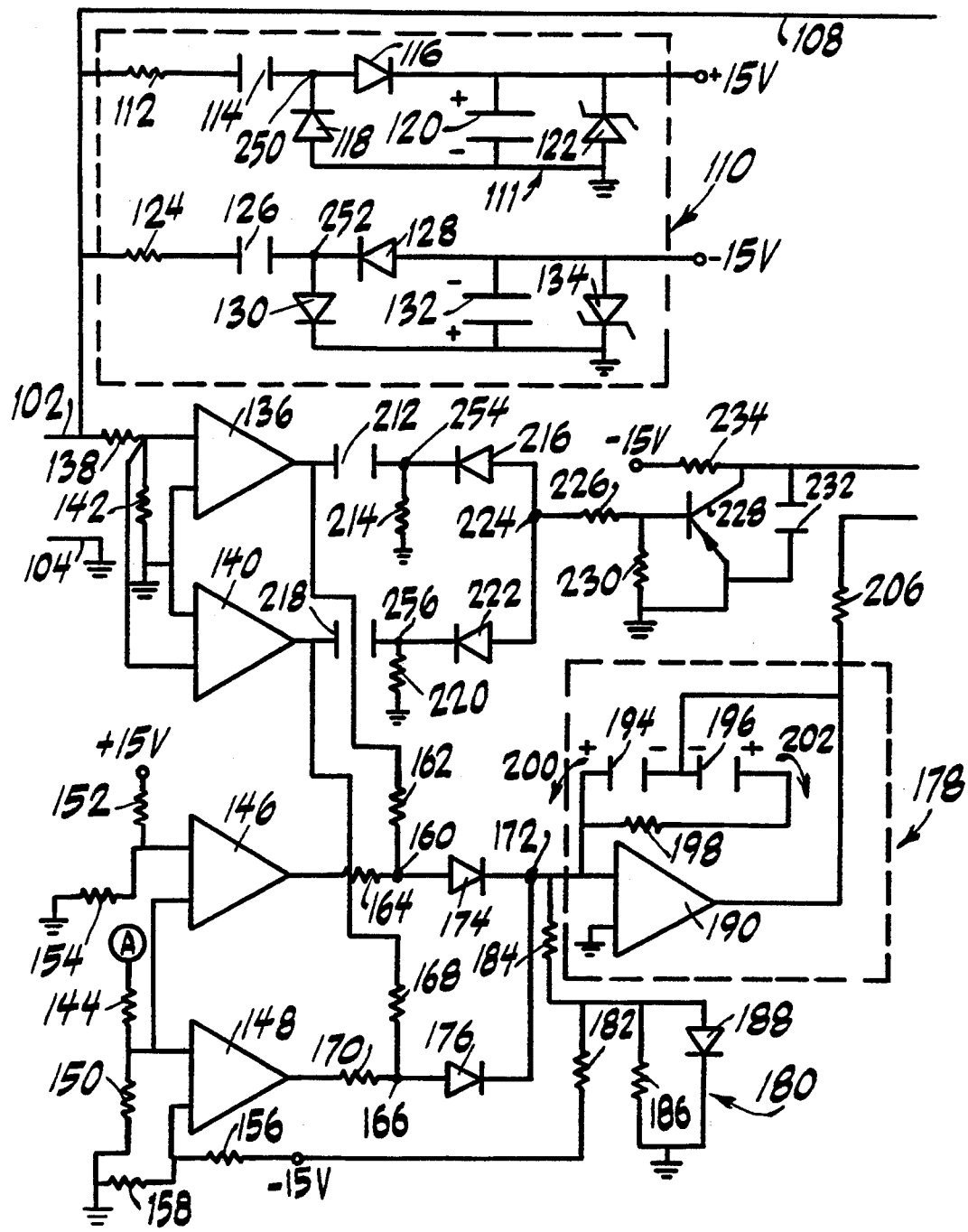
FIGS. 2A and 2B show a circuit diagram of the power control system of FIG. 1.
Figure 2B:
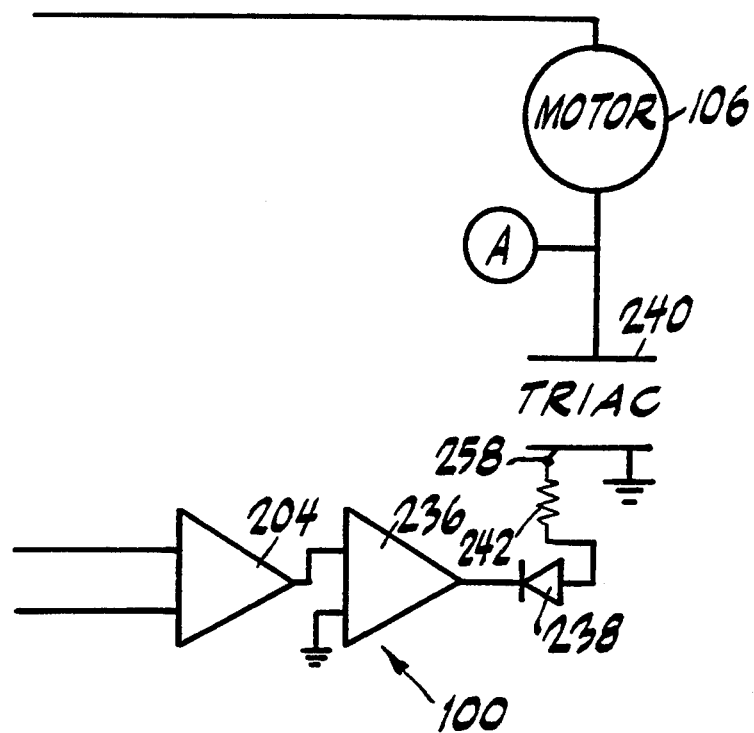

As shown in FIGS. 1 and 2, the control system 100 is coupled between a voltage source and a motor 106. The voltage source may be, for example, an A.C. wall outlet which is coupled to the control system via terminals 102 and 104. The control system shown in FIGS. 1 and 2 can be used with both 110 and 220 volt wall outlets, for example. The motor is illustrated as a single-phase, home appliance, A.C. induction motor, although the principles of the present invention are equally applicable to other types of motors, including, for example, multiple-phase industrial motors.

The line voltage from the wall outlet is fed to the motor 106 over line 108. The line voltage is also fed to a power supply 110, which generates +15 volt and −15 volt operating bias voltages, for example. These bias voltages are required by several components contained in the control system 100, such as the operational amplifiers.

As shown in FIG. 2, the power supply 110 contains two branches, the first branch 111 for providing the +15 volt operating bias voltage and the second branch 113 for providing the −15 volt operating bias voltage. The first branch 111 includes a current-limiting resistor 112 coupled to line 108. The resistor 112 has a small resistance value, for example 100 ohms. For a 110 volt A.C. line voltage, the voltage drop across the resistor 112 is approximately 2 volts, and, thus, the current flowing through the resistor 112 is approximately 20 milliamps. This amount of current through the resistor 112 is significantly smaller than through control system power supply resistors of the prior art, which typically have much larger resistance values, for example 5K or 10K.

Because of this relatively small amount of current flowing through the resistor 112, the power dissipated in the resistor 112 is approximately 40 milliwatts, which is on the order of 25 times smaller than the power dissipated in the control system power supply resistors of the prior art that are mentioned above. Consequently, the power supply of the present invention generates significantly less heat than conventional control system power supplies. This significant reduction of heat generated by the power supply may allow for the reduction in size of the control system and may extend the life of the control system.

The resistor 112 is coupled to an A.C. discharge capacitor 114, which may have a small capacitance value, for example 0.68 microfarads. The inclusion of the fast-acting capacitor 114 in the power supply 110 allows the resistor 112 described above to have a low resistance value and the power supply filter capacitor described below to have a small capacitance value.

The capacitor 114 is further coupled to the anode of a diode 116 and to the cathode of a diode 118. Diodes 116 and 118 together function as a full-wave rectifier. Conventional control system power supplies typically contain half-wave rectifiers, rather than full-wave rectifiers.

The cathode of diode 116 is coupled to the positive terminal of a polarized filter capacitor 120, the negative terminal of which is coupled to the anode of diode 118 and to ground. In an exemplary embodiment of the control system power supply of the present invention, the capacitor 120 has a capacitance value of 47 microfarads, but may be as small as 33 microfarads, as compared to filter capacitors of conventional control system power supplies which have minimum capacitance values of 100 microfarads. Because of the small capacitance value of the filter capacitor 120 contained in the control system power supply of the present invention, the capacitor charges quickly. As a result, the power supply 110 according to the present invention quickly provides the full operating bias voltage of +15 volts, as well as −15 volts, such that the need for a start-up circuit is eliminated.

The cathode of diode 116 is also coupled to the cathode of a zener diode 122, the anode of which is coupled to ground. The rectified signal is filtered by capacitor 120 and set at +15 volts D.C. by the zener diode 122, which functions as a voltage regulator.

The second branch 113 of the power supply 110 is identical to the first branch 111, except that the polarity of the filter capacitor and all of the diodes are reversed. As such, the second branch 113 provides a −15 volt D.C. signal, as opposed to the +15 volt D.C. signal provided by the first branch 111.

In particular, the second branch 113 includes a current-limiting resistor 124 coupled to an A.C. discharge capacitor 126, which is further coupled to the cathode of a diode 128 and to the anode of a diode 130. The cathode of diode 130 is coupled to the positive terminal of a filter capacitor 132, to the cathode of a zener diode 134, and to ground. The anode of diode 128 is coupled to the negative terminal of the filter capacitor 132, and to the anode of the zener diode 134 in order to provide the −15 volt operating bias voltage.

The line voltage is also fed to one input of an operational amplifier ("op amp") 136 and to one input of an op amp 140 through a resistor 138. The other input of each of the op amp 136 and the op amp 140 is coupled to ground. A resistor 142 is coupled between the inputs of each of op amps 136 and 140. The op amps 136 and 140 function as positive and negative voltage square wave generators 141 and 143, respectively.

The current through the motor 106 is fed back, at point A, through a resistor 144 to one input of each of an op amp 146 and 148. Each of these inputs is also coupled to ground through a resistor 150. The other input of the op amp 146 is coupled to a +15 volt supply voltage through a resistor 152 and to ground through a resistor 154. The other input of the op amp 148 is coupled to a −15 volt supply voltage through a resistor 156 and to ground through a resistor 158. The op amps 146 and 148 function as negative and positive current square wave generators 157 and 159, respectively.

The outputs of the op amps 136 and 146 are coupled to a summing point 160 via resistors 162 and 164, respectively. At summing point 160, a summation 165 occurs, and in particular the positive voltage square wave from op amp 136 is added to the negative current square wave from op amp 146.

Likewise, the outputs of the op amps 140 and 148 are coupled to a summing point 166 via resistors 168 and 170, respectively. At summing point 166, a summation 171 occurs, and in particular the negative voltage square wave from op amp 140 is added to the positive current square wave from op amp 148.

The summation signals from summing points 160 and 166 are then logically ORed 173 by feeding the summation signals 160 and 166 to an OR point 172 through diodes 174 and 176, respectively. The signal at OR point 172 constitutes the logical OR of the summation signals from summing points 160 and 166.

The OR signal from OR point 172 is one of the two inputs to an integrator 178. The other input to the integrator 178 is a fixed bias voltage from a command signal circuit 180, which sets a desired power factor of operation. The command signal circuit 180 includes a resistor 182, one end of which is coupled to the −15 volt supply voltage, the other end of which is coupled to resistors 184 and 186 and to the anode of a diode 188. The cathode of the diode 188 is coupled to the other end of resistor 186 and to ground. In an exemplary embodiment of the control system according to the present invention, the resistors 182 and 186 are selected such that the ratio of the resistance value of resistor 182 to the resistance value of resistor 186 is 3:1, and in particular the resistance value of resistor 182 is 39K and the resistance value of resistor 186 is 13K, although this ratio may vary.

The fixed bias voltage at the other end of resistor 184 constitutes the other of the two inputs of the integrator 178. This bias voltage is fixed because the resistance values of all of the resistors contained in the command signal circuit 180 are fixed. That is, the command signal circuit of the present invention 180 does not contain a potentiometer, as contained in conventional power controller command signal circuits. This aspect of the present invention will be explained in further detail below.

As stated above, the OR signal and the fixed bias voltage are provided to the integrator 178. The integrator 178 of the present invention includes an operational amplifier that functions as a comparator 190, the first input of which receives the OR signal and the fixed bias voltage, and the second input of which is coupled to ground. The integrator 178 also includes a filter 192 for filtering the output of the comparator 190 and for feeding the filtered output back to the first input of the comparator 190. As such, the signal at the first input of the comparator 190 is actually the sum of the OR signal, the fixed bias voltage, and the feedback signal.

The filter 192 is a dual-path feedback filter. In particular, the output of the comparator 190 is coupled to the negative terminal of each of a polarized capacitor 194 and a polarized capacitor 196, which may, but need not, have the same capacitance value. The positive terminal of capacitor 196 is coupled to one end of a resistor 198, which may, for example, have a resistance value of 51K. The other end of the resistor 198 and the positive terminal of capacitor 194 are both coupled to the first input of the comparator 190.

Polarized capacitor 194 comprises a first feedback path 200 of the filter 192. Polarized capacitor 196 and resistor 198 together comprise a second feedback path 202 of the filter 192. The inclusion of a polarized feedback capacitor 194, 196, as opposed to a conventionally-used A.C. feedback capacitor, in each of the two feedback paths 200 and 202 allows the capacitance value of each of the feedback capacitors 194, 196 to be several times smaller than feedback capacitors of conventional power control system integrators, for example 0.22 microfarads, without creating instability in the output of the integrator 178, regardless of the load on the motor 106. As such, the feedback through the two paths 200 and 202 of the filter 192 occurs at a very fast rate.

This results in an extremely stable output of the integrator 178, which is commonly referred to as an error signal, over a wide range of loads for a wide variety of motors. Consequently, the integrator 178 of the present invention eliminates the need for a potentiometer in the command signal circuit 180. As discussed above, in conventional motor control systems, a potentiometer is required for adjusting the level of the bias voltage from the command signal circuit based upon the particular motor being controlled, in order to ensure that the integrator output is stable during the normal operation of the particular motor. The integrator 178 of the present invention also allows for the use of a relatively simple ramp circuit, as will be described below, without sacrificing stability of the integrator output.

The output of the integrator 178 is coupled to one of the inputs of a comparator 204 through a resistor 206. The other input of the comparator 204 is supplied by the combination of a negative spike generator 208 and a ramp wave generator 210.

In particular, the output of the op amp 136 is coupled to one terminal of an A.C. capacitor 212, the other terminal of which is coupled to ground through a resistor 214, and to the cathode of a diode 216. Similarly, the output of the op amp 140 is coupled to one terminal of an A.C. capacitor 218, the other terminal of which is coupled to ground through a resistor 220, and to the cathode of a diode 222. At point 224, the anodes of diodes 216 and 222 are coupled together in order to produce a negative spike signal.

The negative spike signal is fed through a resistor 226 to the base of a transistor 228, which is further coupled to ground through a resistor 230. The collector of the transistor 228 is coupled to ground and to one terminal of an A.C. capacitor 232. The emitter of the transistor 228 is coupled to a $-15$ volt supply voltage through a resistor 234. The signal at the emitter of the transistor 228 is a ramp wave which is fed to the comparator 204.

The output of the comparator 204 is coupled to an input of an op amp 236. The other input of the op amp 236 is coupled to ground. The output of the op amp 236 is coupled to the cathode of a diode 238. The anode of the diode 238 is coupled to an input of a single-gate-sensitive triac 240 through a resistor 242 in order to provide a (firing) pulse signal to the triac 240. The "on" time of the triac 240 and, thus, the amount of voltage and current supplied to the motor 106 coupled to the output of the triac 240 are controlled by the duty cycle of the pulse signal, which is defined as the ratio of the amount of time per cycle during which the pulse signal is activated to the total amount of time for a complete cycle.

Figure 3:
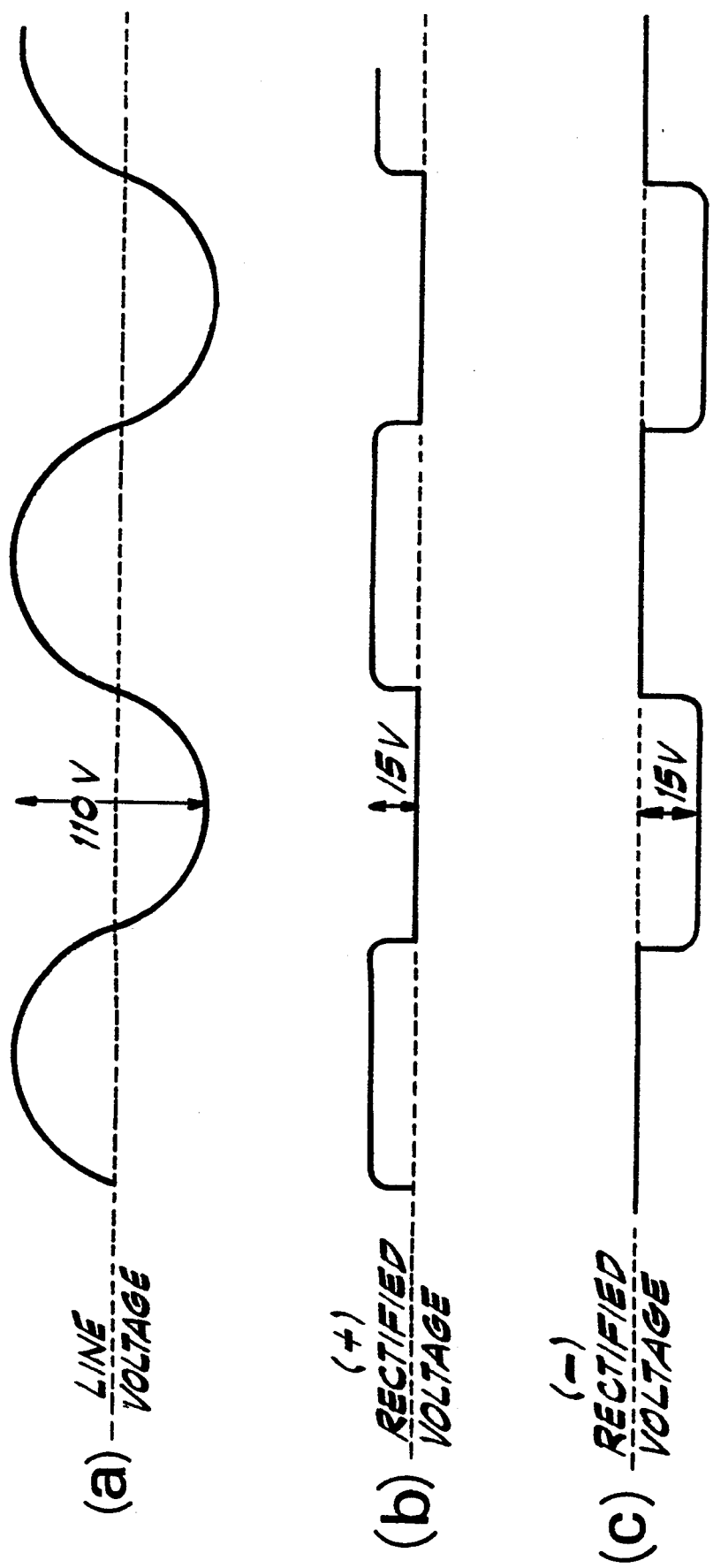
FIG. 3 is a timing diagram illustrating signals in the power supply of the power control system of FIG. 2.
Figure 4A:
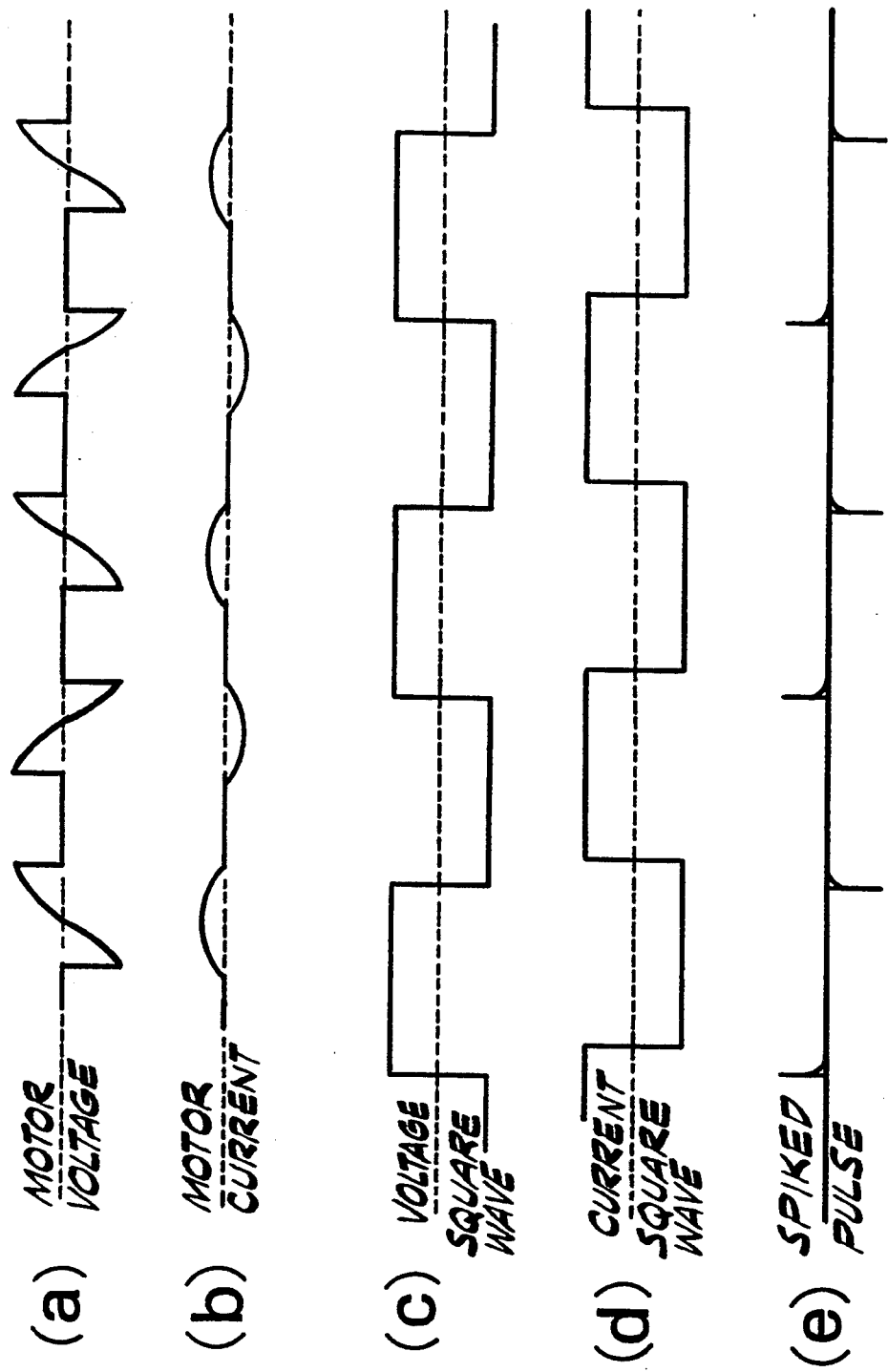
FIGS. 4A and 4B are timing diagrams illustrating various signals in the power control system of FIG. 2.
Figure 4B:
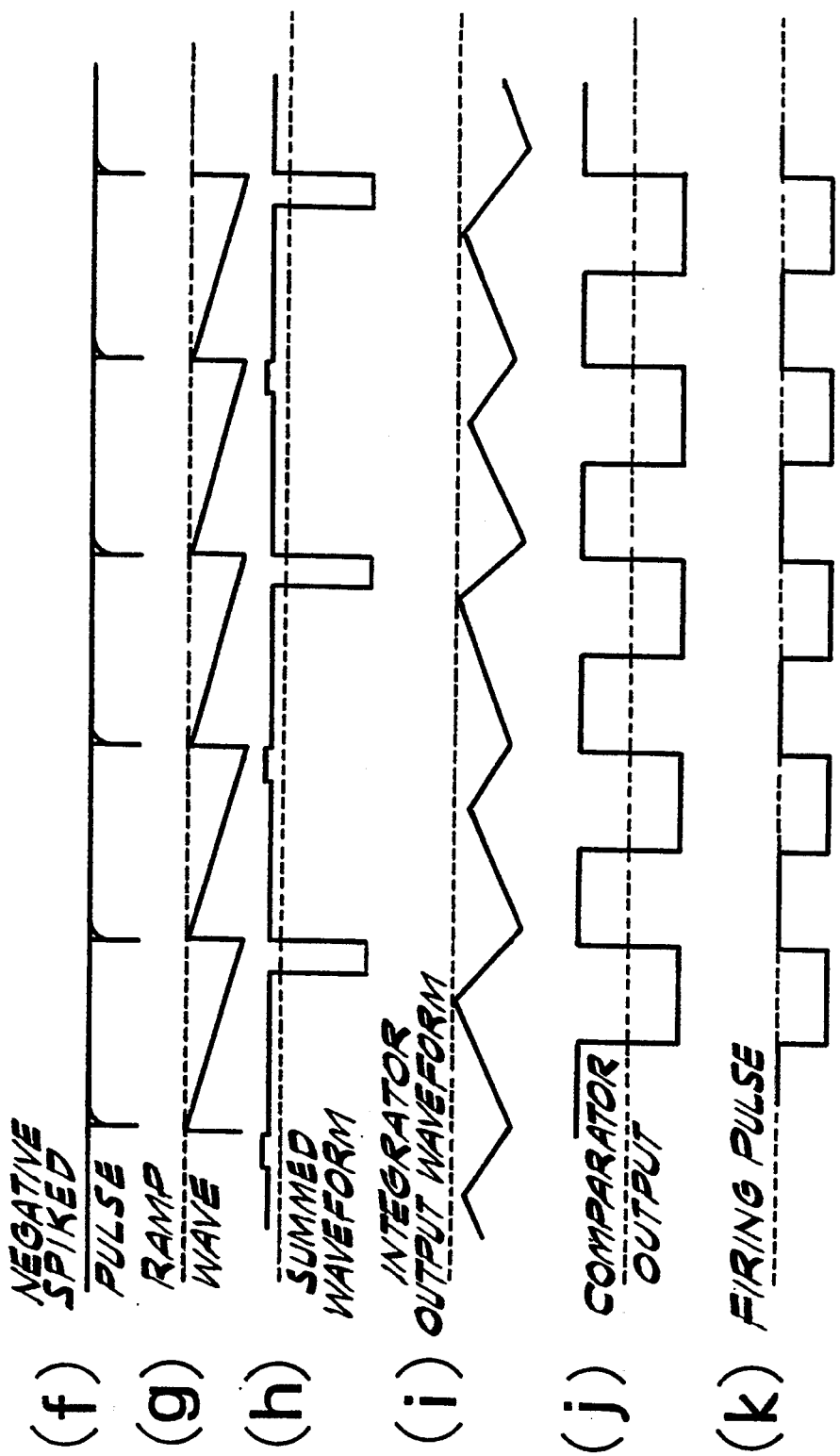

The operation of the power factor control system according to the present invention that is shown in FIGS. 1 and 2 is now further clarified with reference to the timing diagrams of FIGS. 3 and 4.

FIG. 3 is a timing diagram to clarify the operation of the power supply 110 of the present invention. Part (a) of FIG. 3 shows the 110 volt A.C. line voltage fed to the power supply 110. Part (b) shows the (positive) full-wave rectified voltage signal at point 250 in the first branch 111 of the power supply 110. This signal is an unfiltered, $+15$ volt A.C. signal, as compared to a $+79$ volt A.C. signal, for example, in a typical power control system of the prior art. As a result, the power supply of the present invention dissipates significantly less power and, thus, generates significantly less heat than such power control systems of the prior art, as further explained above. This $+15$ volt A.C. signal is used to produce the $+15$ volt D.C. supply voltage at the output of the first branch 111 of the power supply 110 through filtering by the capacitor 120 and voltage regulation by the zener diode 122.

Likewise, part (c) of FIG. 3 shows the (negative) full-wave rectified voltage signal at point 252 in the second branch 113 of the power supply 110. This signal is an unfiltered, $-15$ volt A.C. signal, which is used to produce the $-15$ volt D.C. supply voltage at the output of the second branch 113 of the power supply 110 through filtering by the capacitor 132 and voltage regulation by the zener diode 134.

FIG. 4 is a timing diagram illustrating several of the signals of the power factor control system according to the present invention. Parts (a) and (b) of FIG. 4 show the motor voltage and current, respectively, at feedback point A of FIG. 2. Both the voltage and current are zero when the pulse signal to the triac 240 is zero, i.e., in its non-active state.

Parts (c) and (d) show the voltage and current square wave signals, respectively, at the outputs of op amps 136 and 146, respectively. The outputs of op amps 140 and 148 are the inverses of the outputs of op amps 136 and 146, respectively.

Part (e) shows the spike signal at point 254 in FIG. 2. Once again, the spike signal at point 256 in FIG. 2 is the inverse of that shown in part (e) for point 254. In part (f), there is shown the resulting (negative) spike signal at point 224, which is merely a combination of all of the negative spikes of the signals at points 254 and 256. Part (g) shows the ramp wave generated as a function of the negative spike signal shown in part (f).

Part (h) shows the signal at point 160, i.e., the sum of the signals shown in parts (c) and (d). This signal is then logically ORed, at point 172, with the inverse of this signal from point 166. The ORed signal is then fed to an input of the comparator 190 of the integrator 178, along with the fixed command bias voltage and the feedback signal, as explained above.

The signal at the output of the integrator 178, i.e., the error signal, is a triangular wave as shown in part (i) of FIG. 4. As can be seen in part (i), the peaks of the triangular wave alternate between the value zero and a value slightly below zero. The instances in which the triangular wave peaks at the value zero correspond to integrator feedback through the capacitor 194, while the instances in which the triangular wave peaks at a value slightly below zero correspond to integrator feedback through the capacitor 196 and the resistor 202.

The error signal of part (i) is then compared, in comparator 204, to the ramp wave of part (g). The square wave signal at the output of the comparator 204 is shown in part (j) of FIG. 4.

Finally, part (k) of FIG. 4 illustrates the firing pulse signal to the triac 240, i.e., the signal at point 258 in FIG. 2. The firing pulse signal is generated as a function of the comparator output signal, primarily through operation of the diode 238. As explained above, the duty cycle of the firing pulse signal controls the voltage applied to the motor 106, which in turn controls the flow of current to the motor 106, in order to reduce the power consumed by the motor 106.

What is claimed is:

1. An integrator comprising:
   an operational amplifier having at least one input and an output;
   a first feedback path having a first polarized capacitor, a negative terminal of the first polarized capacitor being coupled to the output of the operational amplifier, a positive terminal of the first polarized capacitor being coupled to the input of the operational amplifier; and
   a second feedback path having a second polarized capacitor and a resistor, a negative terminal of the second polarized capacitor being coupled to the output of the operational amplifier, a positive terminal of the second polarized capacitor being coupled to the input of the operational amplifier, the resistor being coupled between the output and the input of the operational amplifier in the second feedback path.

2. The integrator according to claim 1, wherein the operational amplifier has a second input coupled to ground.

3. An integrator comprising:

a comparator having a first input coupled to ground, a second input, and an output;

a first comparator feedback path having a first polarized capacitor, a negative terminal of the first polarized capacitor being coupled to the output of the comparator, a positive terminal of the first polarized capacitor being coupled to the second input of the comparator; and a second comparator feedback path coupled in parallel with the first comparator feedback path, the second comparator feedback path having a second polarized capacitor and a resistor, a negative terminal of the second polarized capacitor being coupled to the output of the comparator, a positive terminal of the second polarized capacitor being coupled to a first terminal of the resistor, and a second terminal of the resistor being coupled to the second input of the comparator.

4. The integrator according to claim 3, wherein the comparator includes an operational amplifier.

* * * * *